Dec. 12, 1961 D. V. TREMAINE 3,012,809
DETACHABLE CARRYING HANDLE DEVICE
Filed Nov. 20, 1959 2 Sheets-Sheet 1
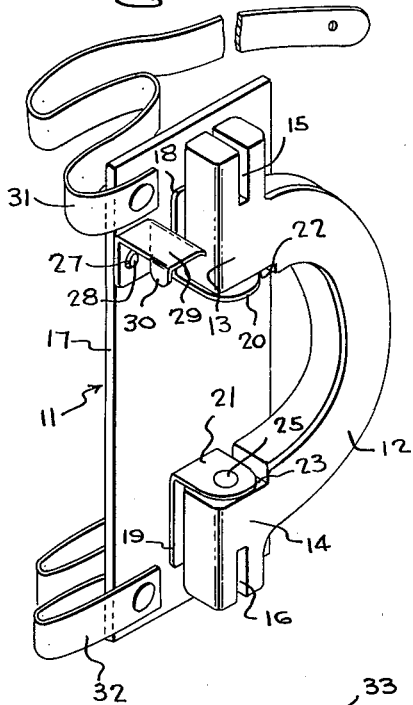
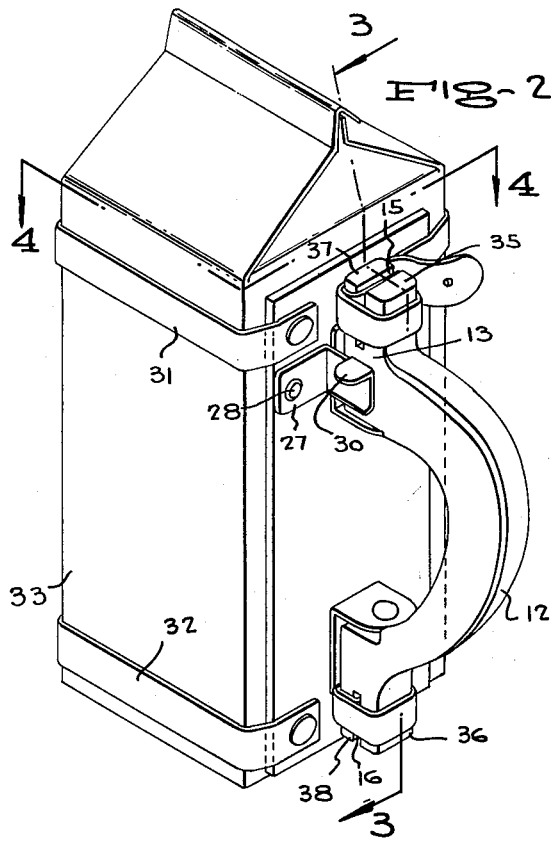
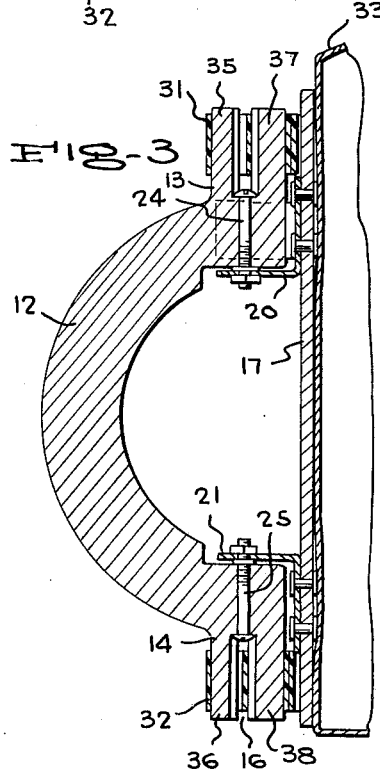
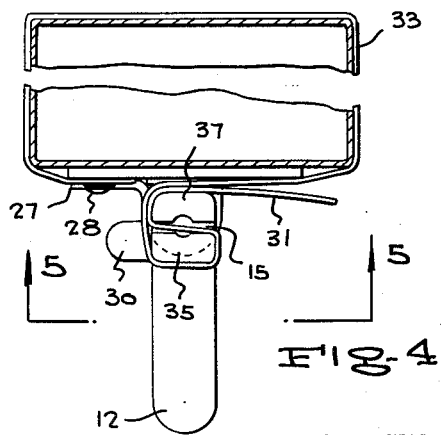
INVENTOR.
DARWIN V. TREMAINE
BY
McMorrow, Berman & Davidson
ATTORNEYS Dec. 12, 1961 D. V. TREMAINE 3,012,809
DETACHABLE CARRYING HANDLE DEVICE
Filed Nov. 20, 1959 2 Sheets-Sheet 2
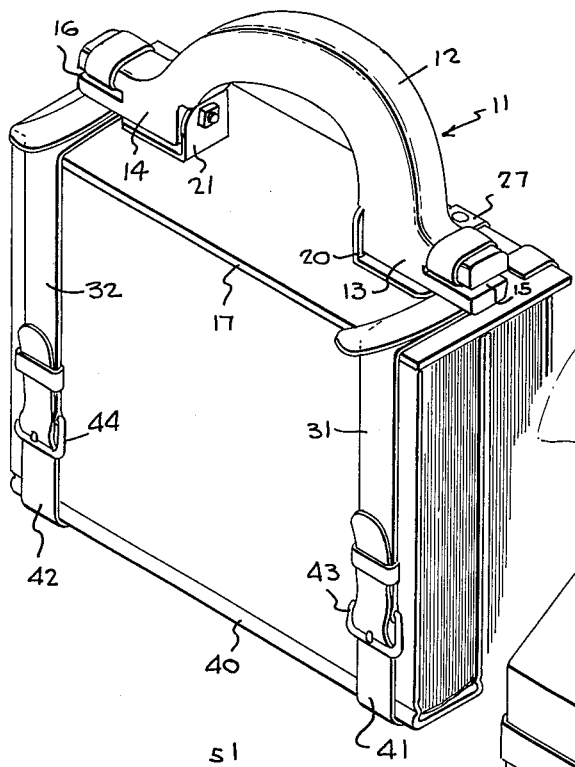
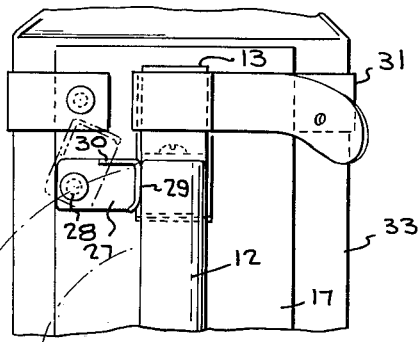
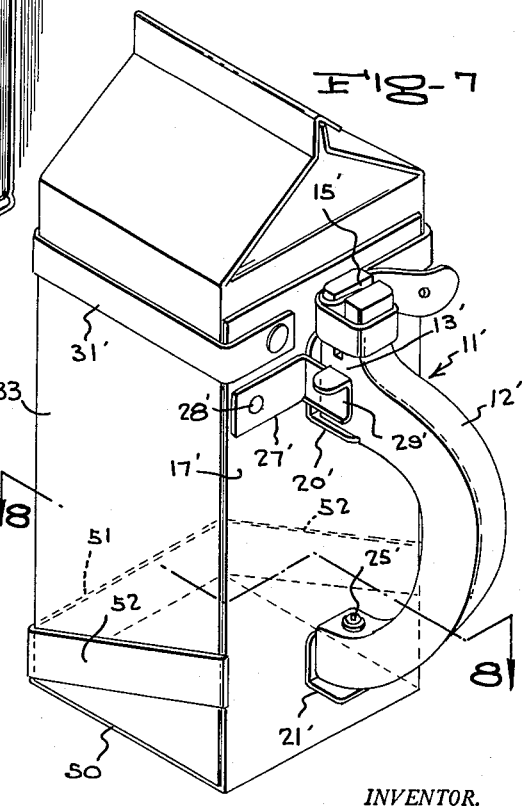
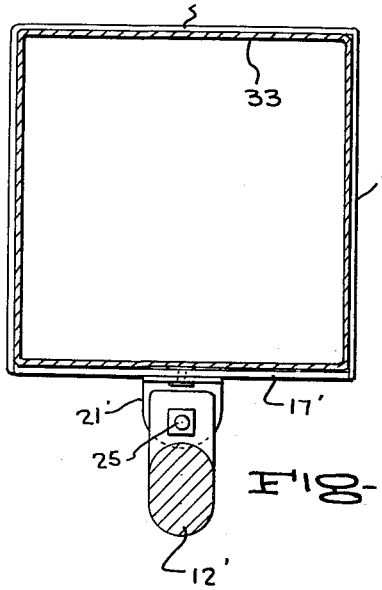
INVENTOR.
DARWIN V. TREMAINE
BY
McMorrow, Berman & Davidson
ATTORNEYS United States Patent Office 3,012,809
Patented Dec. 12, 1961

3,012,809
DETACHABLE CARRYING HANDLE DEVICE
Darwin V. Tremaine, P.O. Box 815, La Porte, Tex.
Filed Nov. 20, 1959, Ser. No. 854,314
4 Claims. (Cl. 294—31.2)

This invention relates to detachable handle devices, and more particularly to a detachable carrying handle device which may be employed as a carrier for various articles, and as a detachable handle device for milk cartons or similar containers, for use in dispensing the contents of such containers.

A main object of the invention is to provide a novel and improved carrying handle device which is simple in construction, which is easy to attach and detach, and which provides a secure and reliable gripping support for an article to be carried or otherwise manipulated.

A further object of the invention is to provide an improved detachable carrying handle device which is inexpensive to fabricate, which is durable in construction, and which may be folded to a relatively compact condition for easy transportation and storage.

Further objects and advantages of the invention will become apparent from the following description and claims, and from the accompanying drawings, wherein:

FIGURE 1 is a perspective view of an improved detachable carrying handle device constructed in accordance with the present invention, shown in its folded condition.

FIGURE 2 is a perspective view showing the manner in which the handle device of FIGURE 1 is engaged with a milk carton for use in supporting the milk carton for dispensing the contents thereof.

FIGURE 3 is a fragmentary vertical cross sectional view taken substantially on the line 3—3 of FIGURE 2.

FIGURE 4 is a fragmentary horizontal cross sectional view taken substantially on the line 4—4 of FIGURE 2.

FIGURE 5 is a fragmentary side elevational view of the upper portion of the milk carton of FIGURE 2 with the carrying handle device attached thereto and illustrating the manner in which the rigid handle element of the carrying handle device is locked in a position perpendicular to the rigid plate member of the device.

FIGURE 6 is a fragmentary perspective view showing the manner in which the carrying handle device of FIGURE 1 is employed as a gripping support for books.

FIGURE 7 is a perspective view showing a modified form of carrying handle device according to the present invention supportingly engaged with a milk carton.

FIGURE 8 is a horizontal cross sectional view taken substantially on the line 8—8 of FIGURE 7.

Referring to the drawings, and particularly to FIGURES 1 to 6, 11 generally designates an improved detachable carrying handle device constructed in accordance with the present invention. The carrying handle device 11 comprises a rigid, generally U-shaped main handle member 12 provided at its opposite ends with the longitudinally aligned, outwardly projecting opposing lug elements 13 and 14, said lug elements being formed with respective open-ended, longitudinally aligned slots 15 and 16. The handle member 12 is pivotally connected at the inside surfaces of the lug elements 13 and 14 to a rectangular rigid plate member 17 by means of respective rigid angle brackets 18 and 19, the angle brackets 18 and 19 being longitudinally aligned and being provided with respective outwardly projecting arms 20 and 21 which are received in shallow notches 22 and 23 provided adjacent the lug elements 13 and 14 and having opposing parallel inside surfaces, and are pivotally connected to the lug elements by respective pivot bolts 24 and 25 at said inside surfaces, as shown in FIGURE 3.

The handle member 12 is formed as a relatively flat member so that the opposite surfaces thereof are substantially parallel, the opposite surfaces of the lug elements 13 and 14 merging with the respective opposite surfaces of the main handle member 12. Designated at 27 is a right angled rigid bracket member which is pivotally connected at 28 to an upper corner portion of the rigid main plate member 17, the bracket member 27 being provided with the outwardly projecting arm 29 which is lockingly engageable with the side surface of the adjacent lug element 13 when the handle member 12 is in a position perpendicular to the main plate member 17, whereby to lock said handle member in said perpendicular position. Thus, as shown in FIGURE 1, the locking bracket 27 may be rotated to a position wherein the handle member 12 may be freely rotated, for example, to and from the folded position thereof illustrated in FIGURE 1, but the pivotal connection 28 of the bracket member 27 is so located that when the handle member 12 is in the perpendicular position thereof illustrated in FIGURE 2, the bracket member 27 may be rotated 90° from the position thereof shown in FIGURE 1 to bring the arm 29 into tight surface-to-surface engagement with the side surface of the lug element 13, whereby to lock the handle member 12 in said perpendicular position, illustrated in FIGURE 2.

A finger lug 30 is provided on the outer end portion of one edge of arm 29 to facilitate rotation of the bracket member 27.

Respective flexible strap members 31 and 32 are secured to the opposite corner portions of the main plate member 17 at one side thereof, for example, at the same side at which the locking bracket 27 is pivoted. The flexible strap members 31 are of sufficient length to engage around a milk carton 33, or other similar object, and the end portions of the flexible strap members may be engaged through the slots 15 and 16 and wrapped around the respective lug elements 13 and 14 in the manner illustrated in FIGURE 2, to lockingly secure the end portions of the strap members to said lug elements.

As shown in FIGURE 5, when the carrying handle device is attached to an object to be carried, for example, the milk carton 33, the locking bracket 27 is first rotated to a non-obstructing position, such as the dotted view position thereof shown in FIGURE 5. The handle member 12 may then be rotated from the position illustrated in FIGURE 1 180° clockwise to a position wherein it is disposed substantially adjacent to the main plate member 17 on the same side thereof as the bracket member 27 is located. The strap members 31 and 32 are then engaged around the carton 33, or other object to be carried, the ends of the strap members being engaged through the slots 15 and 16 and wrapped around the lug elements 13 and 14 in the manner illustrated in FIGURE 2, so that respective loops are engaged around the outer finger members 35 and 36 defined by the open-ended slots 15 and 16 with the remaining portions of the ends of the strap members extending reversely around the remaining finger elements 37 and 38 and passing between said remaining finger elements and the main portion of the strap members, as is clearly illustrated in FIGURE 2. Thus, when the handle member 12 is then rotated from the dotted view position of FIGURE 5 to a position perpendicular to the rigid plate member 17, tension is exerted on the respective strap members 31 and 32, causing said strap members to tighten around the carton 33 or other object to be carried. The handle member 12 may then be locked in the position perpendicular to the rigid plate member 17 by rotating the rigid bracket member 27 from the dotted view position shown in FIGURE 5 to the full line position thereof wherein the arm 29 is in locking engagement with the side surface of lug element 13.

As shown in FIGURE 6, the device of FIGURES 1 to 5 may be employed to carry books 40 or other relatively large objects by employing auxiliary flexible straps 41 and 42 provided with conventional buckles 43 and 44 so that the auxiliary straps 41 and 42 may be attached to the flexible strap members 31 and 32 of the device 11 and thereby may serve as extensions thereof.

Referring now to the form of the invention shown in FIGURES 7 and 8, the carrying device is designated generally at 11' and is provided with a rigid handle 12' which is pivotally connected to a rigid main plate member 17' by respective angle brackets 20' and 21' and suitable longitudinally aligned connecting bolts 25'. A rigid angle bracket 27' is pivoted at 28' to an upper corner portion of the main plate 17' in a position to lockingly engage an end lug 13' provided on the rigid handle member 12'. Thus, the bracket 27' is provided with a locking arm 29' similar to the arm 29 of the previously described embodiment of the invention. A flexible fastening strap 31' is secured to the upper corner portion of rigid plate member 17' adjacent the bracket member 27', as shown in FIGURE 7, the strap 31' being lockingly engageable with the lug 13' by being engaged through a longitudinal, open-ended slot 15' provided in lug 13'.

The plate member 17' is integrally formed at its lower end with a supporting bottom wall 50 which extends perpendicular to the main portion of plate member 17' and is of sufficient size to receive the bottom of a conventional milk carton 33. The member 50 is provided with the upstanding rear flange 51 which faces and is parallel to the main portion of plate member 17'. The side edges of the flange 51 are connected to the side edges of the main portion of plate member 17' by upwardly and forwardly inclined vertical rigid strap elements 52, 52. Thus, a generally rectangular socket or receptable is defined which is suitably dimensioned to receive the lower portion of a conventional milk carton 33 and to support same when the device is held in the upright position illustrated in FIGURE 7.

In using the carrying device 11', the milk carton 33 is first placed in the receptacle defined at the lower portion of the device, as above described, and the strap member 31' is then engaged around the upper portion of the milk carton and secured to the lug 13', the handle member 12' being first disposed parallel and adjacent to the side portion of plate member 17' containing the locking bracket 27', and then being rotated to a position perpendicular to the plate member 17' to tighten the strap member 31', in the manner previously described in connection with the embodiment of the invention illustrated in FIGURES 1 to 6. The locking bracket 27' may then be rotated to the position illustrated in FIGURE 7 wherein the arm 29' lockingly engages the side surface of lug 13', to secure the handle 12' in its operative position. The device 11' may then be employed as a handle for use in dispensing the liquid from the carton 33. After the carton is empty, the handle device may be removed from the carton for use with the next carton.

While certain specific embodiments of an improved carrying handle device have been disclosed in the foregoing description, it will be understood that various modifications within the spirit of the invention may occur to those skilled in the art. Therefore, it is intended that no limitations be placed on the invention except as defined by the scope of the appended claims.

What is claimed is:
1. A carrying handle device comprising a rigid, generally U-shaped main handle member, opposite outwardly projecting longitudinally aligned lug elements on the ends of said handle member and having opposing parallel inside surfaces, a rigid plate member, means pivotally connecting the ends of said handle member at said opposing inside surfaces to said rigid plate member for rotation on a longitudinal axis, flexible strap means secured to said plate member and being lockingly engageable with said handle member, and a rigid locking member pivoted to said plate member for rotation around an axis perpendicular to said plate member and being lockingly engageable with a side surface of the handle member to secure the handle member in a position substantially perpendicular to the plate member.

2. A carrying handle device comprising a rigid, generally U-shaped main handle member, opposed outwardly projecting longitudinally aligned lug elements on the ends of said handle member and having opposing parallel inside surfaces, said lug elements being formed with respective open-ended longitudinal slots, a rigid plate member, means pivotally connecting the ends of said handle member to said rigid plate member at said opposing inside surfaces for rotation on a longitudinal axis, flexible strap means secured to said plate member and being receivable in said slots and being lockingly engageable around said lug elements, and a rigid locking member pivoted to said plate member for rotation around an axis perpendicular to said plate member and being lockingly engageable with a side surface of the handle member to secure the handle member in a position substantially perpendicular to the plate member.

3. A carrying handle device comprising a rigid, generally U-shaped main handle member, opposing, outwardly projecting longitudinally aligned lug elements on the ends of said handle member and having opposing parallel inside surfaces, said lug elements being formed with respective open-ended longitudinal slots, a rigid plate member, means pivotally connecting the ends of said handle member to said rigid plate member at said opposing inside surfaces for rotation on a longitudinal axis, flexible strap means secured to said plate member and being receivable in said slots and being lockingly engageable around said lug elements, and a rigid locking member pivoted to said plate member adjacent one of the lug elements for rotation around an axis perpendicular to said plate member and being lockingly engageable with a side surface of said one of the lug elements to secure the handle member in a position perpendicular to the plate member.

4. A carrying handle device comprising a rigid, generally U-shaped main handle member, opposed outwardly projecting longitudinally aligned lug elements on the ends of said handle member and having opposing parallel inside surfaces, said lug elements being formed with respective open-ended longitudinal slots, a rigid plate member, means pivotally connecting the ends of said handle member to said rigid plate member at said parallel inside surfaces for rotation on a longitudinal axis, flexible strap means secured to said plate member and being receivable in said slots and being lockingly engageable around said lug elements, a rigid bracket member of right angled shape, and means pivotally securing one arm of said bracket member to said plate member adjacent one of the lug elements for rotation around an axis perpendicular to said plate member, the other arm of said bracket member being lockingly engageable with a side surface of said one of the lug elements to secure the handle member in a position perpendicular to the plate member.

References Cited in the file of this patent
UNITED STATES PATENTS

| 121,191 | Oesterle | Nov. 21, 1871 |
| 412,295 | Reynolds | Oct. 8, 1889 |
| 2,832,521 | Gardner | Apr. 29, 1958 |
| 2,907,493 | Drentlaw | Oct. 6, 1959 |

FOREIGN PATENTS

| 14,598 | Great Britain | of 1888 |
| 430,160 | France | Aug. 4, 1911 |